(12) United States Patent
Jaeger

(10) Patent No.: US 7,617,456 B2
(45) Date of Patent: Nov. 10, 2009

(54) MEDIA AND FUNCTIONAL OBJECTS TRANSMITTED IN DYNAMIC PICTURE FILES

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 417 days.

(21) Appl. No.: 11/599,044

(22) Filed: Nov. 13, 2006

(65) Prior Publication Data

US 2007/0061737 A1    Mar. 15, 2007

Related U.S. Application Data

(63) Continuation-in-part of application No. 10/671,953, filed on Sep. 26, 2003, now abandoned, and a continuation-in-part of application No. 10/635,745, filed on Aug. 5, 2003, now abandoned.

(51) Int. Cl.
G06F 3/00      (2006.01)
G06F 3/14      (2006.01)
G06F 17/00     (2006.01)

(52) U.S. Cl. .................. 715/748; 715/744; 715/838; 715/205

(58) Field of Classification Search .......... 715/719, 715/748, 764, 765, 205, 716, 744, 746, 749, 715/835, 837, 838, 839; 707/104.1
See application file for complete search history.

(56) References Cited

U.S. PATENT DOCUMENTS

| | | | | |
|---|---|---|---|---|
| 5,781,190 A * | 7/1998 | Gorbet et al. | ............... | 715/748 |
| 6,300,952 B1 * | 10/2001 | Sidwell et al. | ............... | 345/419 |
| 6,711,637 B2 * | 3/2004 | Tateyama | ..................... | 710/65 |
| 6,967,675 B1 * | 11/2005 | Ito et al. | .................. | 348/207.1 |
| 7,346,850 B2 * | 3/2008 | Swartz et al. | ............... | 715/763 |
| 2002/0133543 A1 * | 9/2002 | Fujiwara | ..................... | 709/203 |
| 2002/0156923 A1 * | 10/2002 | Tanimoto | .................... | 709/246 |
| 2003/0088582 A1 * | 5/2003 | Pflug | ....................... | 707/104.1 |
| 2003/0196169 A1 * | 10/2003 | Wittkotter et al. | ........... | 715/513 |
| 2005/0210393 A1 * | 9/2005 | Maeng | ........................ | 715/751 |

* cited by examiner

*Primary Examiner*—X. L Bautista
(74) *Attorney, Agent, or Firm*—Harris Zimmerman; Howard Cohen

(57) ABSTRACT

A method for transmitting media, data, and text files in a manner that minimizes the use of bandwidth and memory comprises a BSP file containing a picture of the contents, as well as links to the content of the various components. When the recipient opens the message, the total visual content and all functional objects are depicted in the message display. The recipient may interact with the displayed content and functional objects; as these interactions create a demand for more data on the message content, the BSP file is queried for links to that content, and it is transmitted from the sender, as required by the recipient.

4 Claims, 3 Drawing Sheets

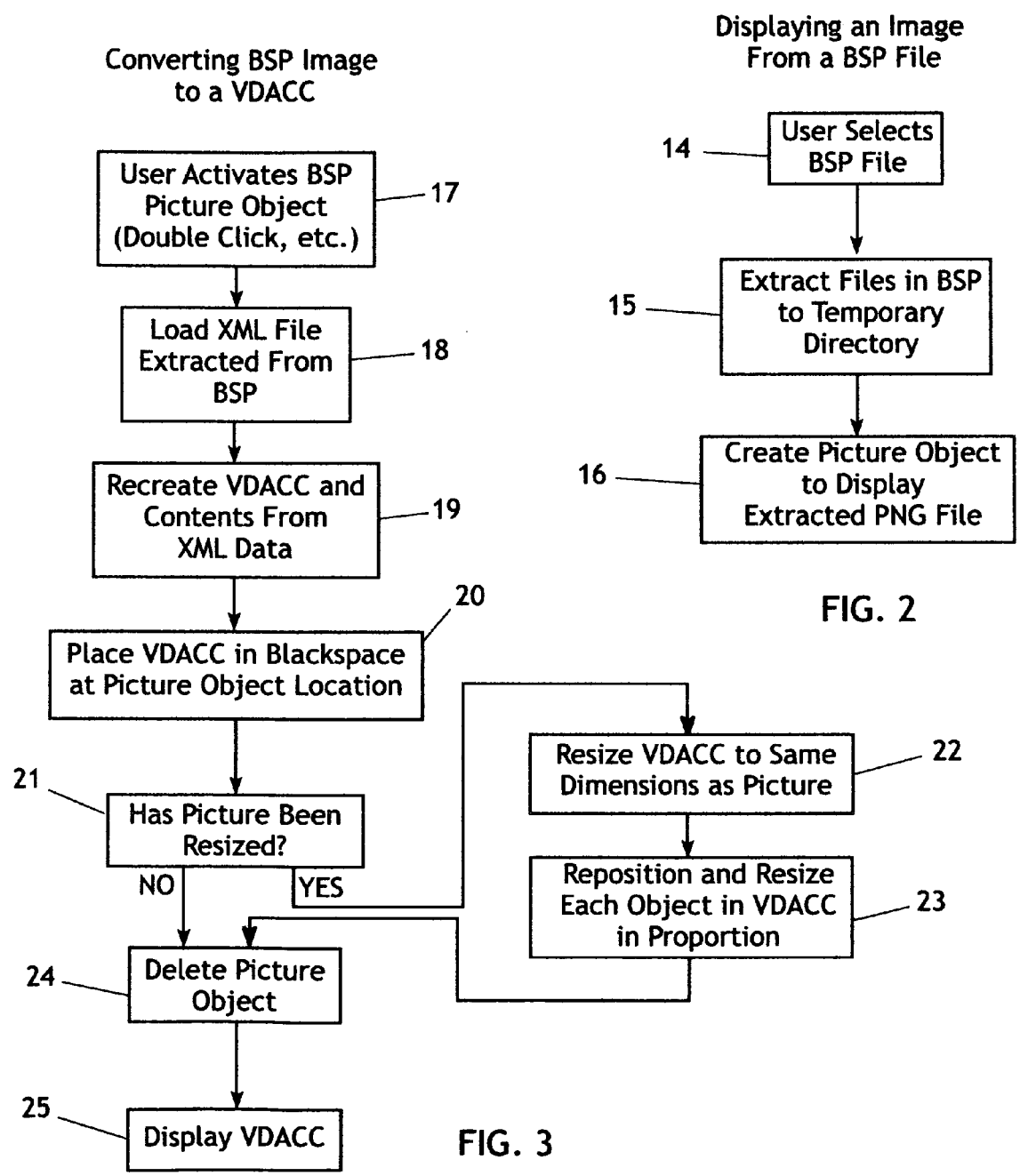

US 7,617,456 B2

MEDIA AND FUNCTIONAL OBJECTS TRANSMITTED IN DYNAMIC PICTURE FILES

CROSS-REFERENCE TO RELATED APPLICATIONS

This application is a continuation-in-part of application Ser. No. 10/635,745, filed Aug. 5, 2003, now abandoned and Ser. No. 10/671,953 filed Sep. 26, 2003, now abandoned which describe the computing environment that includes VDACCs and Blackspace.

FEDERALLY SPONSORED RESEARCH

Not applicable.

SEQUENCE LISTING, ETC ON CD

Not applicable.

BACKGROUND OF THE INVENTION

1. Field of the Invention

This invention relates to the transmission of data between electronic machines through file transfers in internet and intranet systems and, more particularly, to file structures that include picture or photo formats as well as functional objects, text, media content, and the like.

2. Description of Related Art

A major use for the modern internet or intranet systems is the transfer and exchange of files between individuals who may be separated by thousands of mile or merely the wall of adjacent offices in the same building. In the most common form of this transaction, one individual composes an email and attaches a file to the email. The attached file may be a photo, audio or video, data, or other similar type of file. Such files may be quite large compared to the few bytes of the email words themselves. Thus it is commonplace to have email attachments that are many megabytes in size. The email is sent as a combination of the message and attachment, and the large combined file may necessitate significant upload time for the sender and considerable download time for the recipient.

Even if the email bears a thumbnail image of the file, the recipient must often download the file to review it and determine if it is worth reading, viewing, or keeping. Thus the time required to carry out the downloading of attached files may be wasted if the documents thus obtained are not desired. Yet there is no provision in the prior art for apprising the recipient of the file contents, other than downloading and reading it. This flaw in email systems as presently constituted not only wastes bandwidth of the network, it also fills too much of a server's memory with files that would not have been transmitted if their content had been transmitted and reviewed first.

Furthermore, network systems are too often vulnerable to malicious software such as viruses and worms, and these are frequently propagated as attachments to email messages. As a simple defensive measure, many recipients have adopted the habit of not opening any attachment, or email with an attachment, unless the sender is known to the recipient. The result has been that some fraction of authentic email traffic is not received or not read by the recipient, and the overall efficiency of the communications system is correspondingly diminished in comparison to the ideal situation in which all legitimate communications are successfully delivered to all intended recipients.

BRIEF SUMMARY OF THE INVENTION

The present invention generally comprises a method and system for transmitting media, data, and text files in a manner that minimizes the use of bandwidth and consumption of memory of servers in the network. In one aspect, the invention comprises a file structure that incorporates data for one or more documents or devices or functional objects, video/audio/animation media, photo or image art content, or the like. This file structure, termed herein a BSP file, contains a picture of the contents, as well as links to the content of the various components. When the file is sent initially, it is very small, (as little as 1 KB or less), so it may be transmitted very quickly, and it will occupy a small amount of memory on the server.

When the recipient opens the message, the total visual content and all functional objects are depicted in the message display. The recipient may interact with the displayed content and functional objects; as these interactions create a demand for more data on the message content, the BSP file is queried for links to that content, and it is transmitted from the sender or from a server, as required by the recipient. Thus the bulk of the message is transmitted only if and when it is required by the recipient, using a minimum of bandwidth and memory for the initial message.

In another aspect, the invention includes a file structure that has a pictorial representation of its content or components, and also has embedded in it functional objects that enable the recipient to access the content, even though the recipient may not have the software to access the content on the recipient's computer.

In a further aspect, the invention comprises a realization of a file transfer system having the features described above in the setting of Blackspace™, a computing environment in which the user interacts with onscreen objects in a intuitive graphic control system, as described in U.S. patent application Ser. No. 10/635,742, filed Sep. 26, 2003, and Ser. No. 10/671,953 filed Aug. 5, 2003, which are incorporated herein by reference. Briefly, in this computer environment a computer display may depict one or more VDACCs, which manage areas on the Global Drawing Surface, but which have visual boundaries within a virtual display space, each VDACC managing one or more objects and functional relationships that are graphically represented. These objects may be data files, functional objects like a video mixing control panel, an audio player, a slide show, an audio player; or media files including audio, video, animation, and the like, as well as any functional relationships among the objects. In general, functional relationships and transactions are set up by a user primarily through the use of graphic directions and connections established, for instance, by arrows drawn between and among the graphic representations of the objects in each VDACC. Alternatively, functional relationships and transactions may be set by the user through making a selection in the Info Canvas of an object or VDACC or by dragging and dropping objects into a VDACC.

In Blackspace the user designates a file to be transmitted, as by email, by, for example, drawing an arrow from the file object to an email object onscreen. Other methods include making a selection in an info canvas or its equivalent (a menu) or using a vocal command, for instance, "send email." The object is identified as a VDACC, and the software captures an image of the VDACC as it is displayed at that moment. The image is then converted to a PNG file, or other suitable picture file format, which is widely readable on many computer platforms. The software also saves the VDACC and its contents as XML data or other suitable software data, like JAVA, net, HTML, etc. Then it writes this data to a file. It then queries the user to determine if the media files managed by the VDACC (if any) are to be included. If yes, the software iterates through all the graphic objects managed by the VDACC, and determines if these graphic objects have any media content associated with them. If so, the media content is added to a list of media files.

The software system then creates a BSP file named by the user, and then iterates through the list of media files created in the previous steps. This may include the captured PNG file, the XML and any other media files found. Each file in the list is embedded into the BSP file, including the name, length, and data contained in the file. The system then creates a picture object that displays the captured PNG image contained in the BSP file. This picture object is a small file (on the order of tens of kilobytes), which is easily transmitted and stored on a server or recipient's computer. However, this small file contains the file data and XML data, or its equivalent, that enable the file to be reconstituted whenever required, by transmitting demands for the XML, or its equivalent, and other data to reconstruct the onscreen objects managed by the received VDACC as those objects are engaged by the recipient.

The software uploads the individual media elements to a server in a directory on the server that has the same name that the user gave the BSP file. The software determines which media files are not present on the recipient's local hard drive and these are downloaded from the server (or they can be downloaded peer-to-peer from the sender) to his hard drive.

For example, if there were 100 elements associated with a BSP file and the recipient already had 95 of them on the computer hard drive, the software would only pull down 5 of them from the server; that is, the five the recipient does not have.

The picture (NBOR PiX) attachment to an email contains a link to the media elements that belong to that picture. A NBOR Pix is a .PNG picture file that has a link to a BSP file that has a link to the individual media elements on the server. NBOR PiX is a standard .PNG picture file with added header information. When a recipient uses a NBOR PiX, large data files that are associated with that NBOR PiX are not necessarily transmitted unless and until they are required, resulting in a tremendous savings in initial file size and storage capacity.

The methods described herein are not limited to transmitting VDACCs. Other objects can be used to create BSP and NBOR PiX files. For instance, a picture, free drawn line, recognized object (e.g., star, circle, triangle, rectangle) or recognized device (e.g., switch, fader, knob, joystick,) and the like could all be used to assign data to. This data could include pictures, text, documents, layouts, environments, devices, sketches, animation, video, sound files, indeed anything that can be created in a computer environment. Then for each of the assigned-to objects the user could select "email" or its equivalent and create a BSP file and then a NBOR PiX file for that data associated with that object. In this regard, using these objects would be essentially the same as using a VDACC.

Converting a BSP file back to a VDACC or free drawn line, picture, recognized object, device or the like involves in general reversing the previous steps to construct the BSP file. First, the recipient (hereinafter, user) selects the BSP file, and the software system extracts the files contained in the BSP to a temporary directory. It then creates a picture object which displays the PNG image on the recipient's display. The BSP picture may lie dormant, in which case no further data transfer is required. However, if the recipient activates the BSP picture object, by double clicking on it, or the like, the system loads the XML file or its equivalent extracted from the BSP. It then recreates the VDACC or the assigned-to object and its contents from the XML data or its equivalent. It then positions the VDACC or assigned-to object in Blackspace at the same point as the picture object. If the picture has been resized, the system then resizes the VDACC or assigned-to object in proportion, and can also resize the graphic objects contained and displayed within the VDACC or that are assigned to the assigned-to object, also in proportion to the same resize ratio. Thereafter the picture object is deleted, and the VDACC or assigned-to object is displayed, exactly as it was constituted when it was converted to the BSP file.

It is noted that many objects may be used to create BSP and NBOR PiX files. However, for purposes of simplicity this patent will refer only to the VDACC, while recognizing that the means and methods described herein apply to any assigned-to object as well.

In an alternative to this embodiment, the system may create a NBOR PiX file, in which the file content data is not embedded within the file structure. Rather, the system creates a BSP file as described previously, and creates a PNG file from the image of the VDACC that has been captured. It then embeds text in the PNG file that contains the URL of the server from which the BSP file contents may be downloaded, using an FTP or http protocol, or the like. The BSP file is then uploaded to the server or individual media elements are uploaded to the server in a folder that bears the name of the BSP file. The recipient launches email software, and receives the new message having the PNG file and the embedded links.

To retrieve a NBOR PiX file, the user drags or imports the PNG file from their email (it can be dragged directly to Blackspace), and activates the object by double clicking or the like. The software then attempts to find the text containing the server and link addresses from which the BSP file may be downloaded. If that data is found, the system attempts to download the BSP file using the FIP or http protocols or their equivalent. That downloaded data is then used by the recipient's computer to recreate the VDACC from the BSP file, as described above.

A salient aspect of the invention is that the transferred file could have embedded in it the software necessary to carry out the reconstruction of all the objects within the transmitted VDACC. That is, the file initially contains sufficient Blackspace software to carry out the steps necessary to reconstruct the file. In addition, the file contains links that can transmit other functional objects. Thus, for example, if the transmitted VDACC contains a fully functioning video editing console with fader controls and/or knob controls for the audio and video processing functions, that console would be transmitted and re-constituted as a functioning onscreen object device within the recipient's computer.

BRIEF DESCRIPTION OF THE DRAWING

FIG. 2 is block diagram depicting the steps required to display an image from a BSP file.

FIG. 3 is a block diagram depicting the steps required to convert a BSP image file to a VDACC object.

DETAILED DESCRIPTION OF THE INVENTION

The present invention generally comprises a method and system for transmitting media, data, and text files in a manner that minimizes the use of bandwidth and consumption of memory of servers in the network.

In one aspect, the invention introduces a new computer file structure, termed herein a BSP file, which contains a picture of the contents of the file, as well as links to the contents of all the various components of the file. The initial BSP file may be quite small, and is tailored to be transmitted very quickly and to occupy a small amount of memory on the file server of the network (internet, intranet, or the like).

Figure 1:
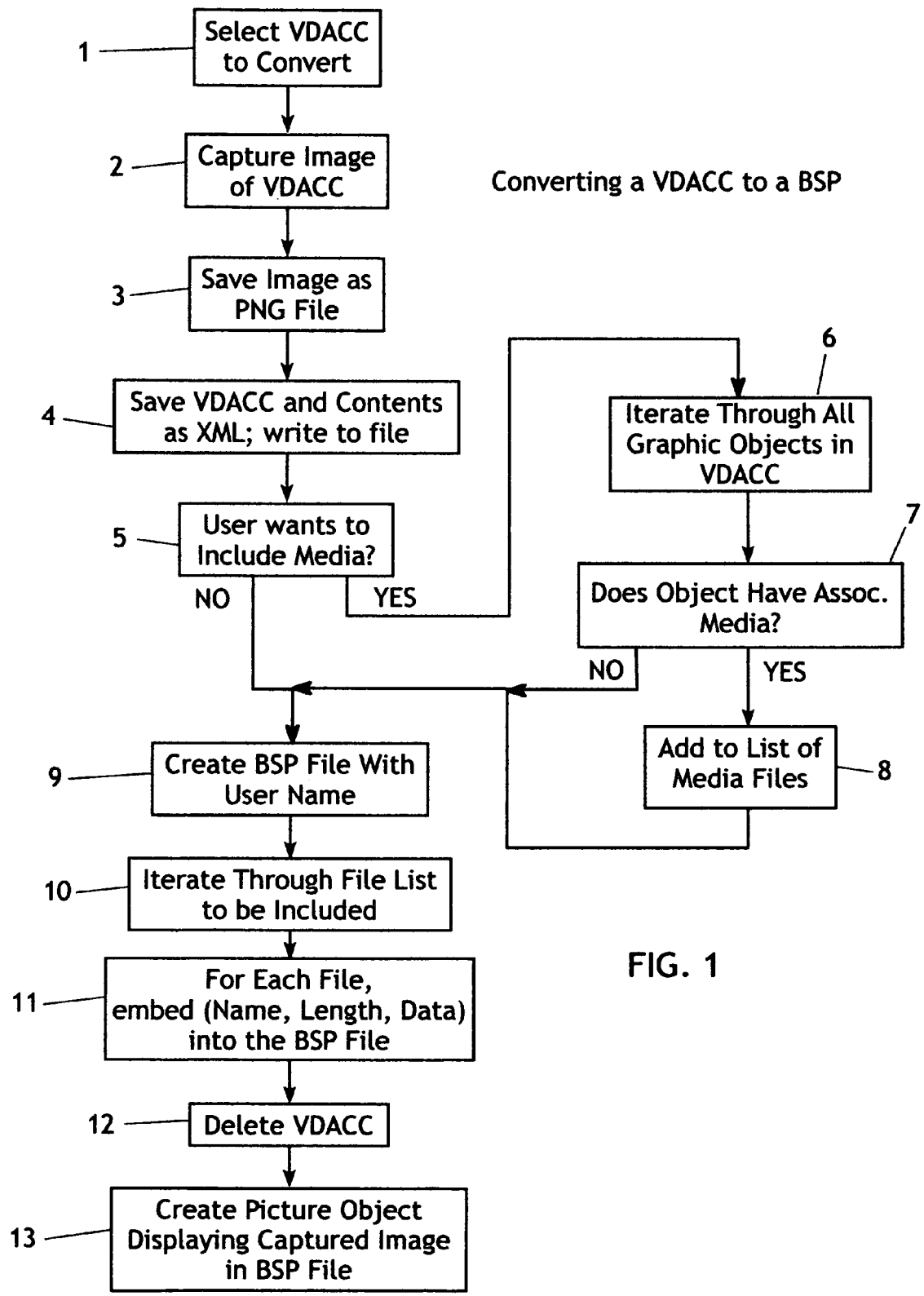
FIG. 1 is a block diagram depicting the steps required to convert a VDACC object file into a BSP file.

With reference to FIG. 1, in a Blackspace computer operating environment, a user may select a file to be transmitted to a recipient by email or the like. This may be accomplished by the user (hereinafter, the sender) for example, drawing an arrow from the file object to an email object onscreen. In step 1, the file object is identified as a VDACC (visual display and control canvas), and in step 2 the software creates an image of the VDACC as it is displayed at that moment on the sender's computer display screen. In step 3, the image is converted to a PNG file, or other suitable picture file format that is readable on a wide variety of computer platforms.

In step 4 the software saves the VDACC and its contents as XML objects, and writes this data to a file. In step 5 the software then queries the sender to determine if the media files in the VDACC (if any) are to be included in the file transmission. If yes, then in step 6 the software iterates through all the graphic objects in the VDACC and determines if they have any media content associated with them (step 7). All media content is added to a list of media files in step 8. In step 9 of the method the software creates a BSP file that is named by the sender, and in step 10 it iterates through the list of media files created in step 8 (or the no files case of step 5). These media files may include the captured PNG file, XML files, and any other media-type files that are associated with the graphic objects of the VDACC. Thereafter, in step 11 the name, size, and identifying data of each media file is embedded into the BSP file structure. In step 12 the original VDACC file is deleted, leaving the BSP file. Step 13 involves creating a picture object that displays the captured PNG image contained in the BSP file. The PNG image is a small file, only a few kilobytes, which may be transmitted easily and stored on the network server or on the recipient's computer. Although small, this file contains the file data and XML data that permits the BSP file to be reconstituted as the original VDACC file whenever required. This is accomplished by transmitting demands for the XML and other data to reconstruct the onscreen objects in the transmitted VDACC, but only as those objects are engaged by the recipient.

Thus the transmission of the complete VDACC may take place in many stages, each stage occurring automatically in response to the demands of the recipient. If the recipient reviews the picture object and wishes to view or utilize only some parts of the original VDACC, only those parts will be transmitted. In this way the bandwidth and memory capacity that is utilized is reduced to only the amount that is required by the usage of the transmitted file by the recipient.

For example, with regard to FIG. 2, the method steps involved in utilizing a BSP file include the user (who may be a recipient or other possessor of the BSP file) selecting the BSP file, in step 14 of FIG. 2. The software system then extracts the file data contained in the BSP, in step 15, and places that file data in a temporary directory. In step 16 the software creates a picture object that displays the PNG image (formerly created in step 3, for example). This picture object is typically displayed on the user's computer, where it may reside with no further action or use.

However, if the user chooses to activate the picture object (the PNG image that represents the BSP file), the user may do so (step 17, FIG. 3) by double clicking on the picture object or using Blackspace arrow logic techniques. The system then loads the XML file that was extracted from the BSP file (step 18). It then recreates the VDACC and its contents from the XML data (step 19), and positions the VDACC in Blackspace in the same location as the PNG picture object (step 20). The software then checks to determine if the picture has been resized (step 21); if so, it resizes the VDACC to the same dimensions as the picture (step 22), and repositions and resizes each object displayed and contained in the VDACC (step 23). Then, in step 24 the picture object is deleted (whether or not the picture has been resized. Thereafter, in step 25 the reconstructed VDACC is displayed. Thus the original VDACC is displayed as it was constituted when it was converted to the BSP file. Note, however, that the full contents of the VDACC have not yet been transmitted from the BSP artifact. Rather, as each object (functional, graphic, media or otherwise) is engaged by the user, the software will request transmission of the full object file to the recipient's computer, and only then will the transfer take place. Thus bandwidth use and server memory capacity are utilized only when necessary, resulting in the most efficient, most optimal file transfer system.

Figures 4, 5:
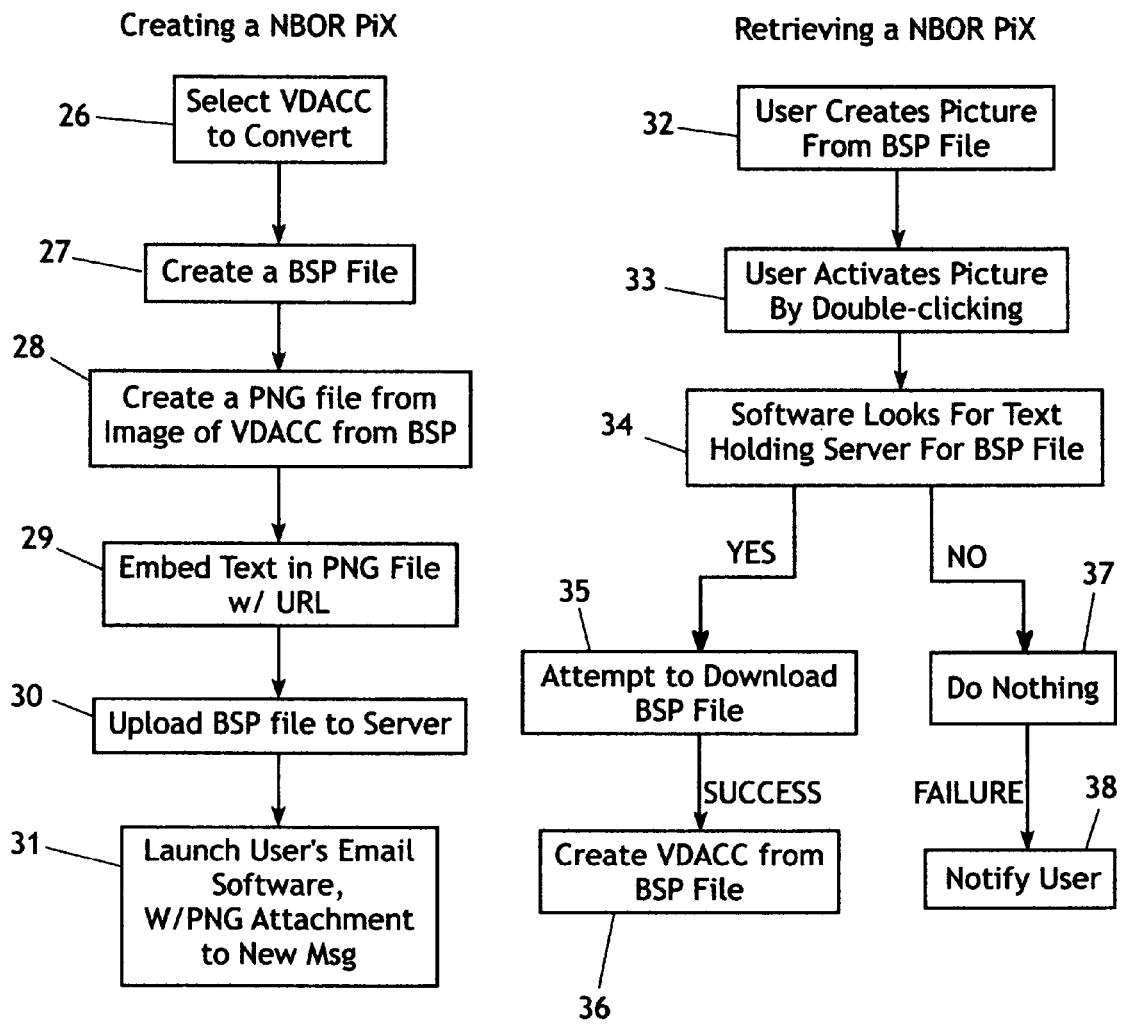
FIG. 4 is a block diagram showing the steps to create a NBOR PiX file from a VDACC object.
FIG. 5 is a block diagram showing the steps to retrieve and recreate a VDACC from a NBOR PiX file.

With regard to FIG. 4, the invention offers an alternative embodiment to the method described previously by creating a NBOR PiX file. First, a sender selects a VDACC to convert, in a parallel to step 1 of FIG. 1. The software then creates a BSP file as described above (step 27), and in step 28 a .PNG file is created from the image of the VDACC that has been captured. The software then embeds text in the .PNG file that contains a URL that links to a server file from which the BSP file contents may be downloaded, using an http protocol, FTP protocol, or the like (step 29). Thereafter, in step 30 the BSP file is uploaded to the server that operates the transmission network; alternatively, individual media elements may be uploaded to the server in a folder that bears the name of the BSP file. When the recipient launches or checks email (step 31), the recipient receives the new message having the .PNG file and the embedded links. Thus the bulk of the contents of the original VDACC are available to the recipient through the URL link, but are not transmitted and do not burden the network capacity unless and until the recipient requests them by activating the URL link(s).

The recipient's computer creates a picture from the BSP file, in step 32 (FIG. 5). The picture permits the recipient to be apprised of the contents of the PiX file by visually inspecting the PNG image, and may then select the portions of the BSP file to read and inspect. Activating (as by clicking, double-clicking, etc.) the portion of the .PNG image (step 33) causes the software to look for the text holding the server URL data for the BSP file (step 34). If the URL data is found, the software in step 35 will attempt to download the BSP file, and thereafter in step 36 to create the VDACC from the BSP file. If the URL data is not found, or is not present, the software will do nothing (step 37), and will issue a failure notice to the recipient in step 38. Once again, it may be noted that the transmission of the file contents through the URL links may take place in stages, depending on the portions of the reconstructed VDACC with which the recipient engages and interacts. Thus the use of bandwidth and recipient's computer memory are minimized until required, so that the transmission process is optimized.

The transferred file may have embedded in it the software necessary to carry out the reconstruction of all the objects within the transmitted VDACC. That is, the file initially contains sufficient Blackspace software to carry out the steps necessary to reconstruct the file. In addition, the file may contain links that can transmit other functional objects. Thus, for example, if the transmitted VDACC contains a fully functioning video editing console with fader controls and/or knob controls for the audio and video processing functions, that console may be transmitted and re-constituted as a functioning onscreen object device within the recipient's computer. Thus the recipient may receive functional software that heretofore was known as separate application software, but is now incorporated into the Blackspace computing environment.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A method for transmitting media files and functional objects from a sender to a recipient, including the steps of:
   designating a VDACC file to be transmitted to the recipient as a transmitting file, said VDACC transmitting file including at least one element selected from a group consisting of text files, media files, and data files, and at least one functional object associated with said at least one element and capable of reconstructing said at least one element for the recipient;
   capturing an image of said transmitting file depicting said at least one element and said at least one functional object and converting said image to a picture file format;
   analyzing said transmitting file to determine all media files therein;
   generating a list of all media files within said transmitting file and embedding said list in said picture file format;
   sending said picture file to said recipient while withholding sending said one or more elements of said transmitting file;
   said recipient viewing said picture file and engaging the depiction portions of said picture file corresponding to said at least one element to select said at least one element;
   said selected at least one element being transmitted to said recipient after said recipient selects the depiction of said at least one element.

2. The method of claim 1, further including the step of said recipient resizing said transmitting file where at least one of said elements are resized by the same proportion.

3. A method for transmitting media files and functional objects from a sender to a recipient, including the steps of:
   designating a file to be transmitted to the recipient as a transmitting file, said transmitting file including at least one element selected from the group consisting of: a text file, media file, data file, functional object, graphical object;
   capturing an image of said transmitting file and converting said image to a picture file format;
   analyzing said transmitting file to determine all media files therein;
   generating a list of all media files within said transmitting file;
   generating a URL link to said list of all media files and embedding said URL link in said picture file format
   embedding in said transmitting file the software necessary to carry out the reconstruction of all the objects within said transmitting file;
   sending said picture file to said recipient while withholding sending said one or more elements of said transmitting file; and,
   further including the step of said recipient viewing said picture file which displays said elements of said transmitting file and selecting one or more elements of said transmitting file by engaging the depiction of said one or more elements in said display of said picture file.

4. The method of claim 3, wherein said selected one or more elements is transmitted to said recipient through said URL link after said recipient selects said one or more elements.

* * * * *